INVENTOR
SAMUEL WEBB,
by: John E. Jackson
his Attorney.

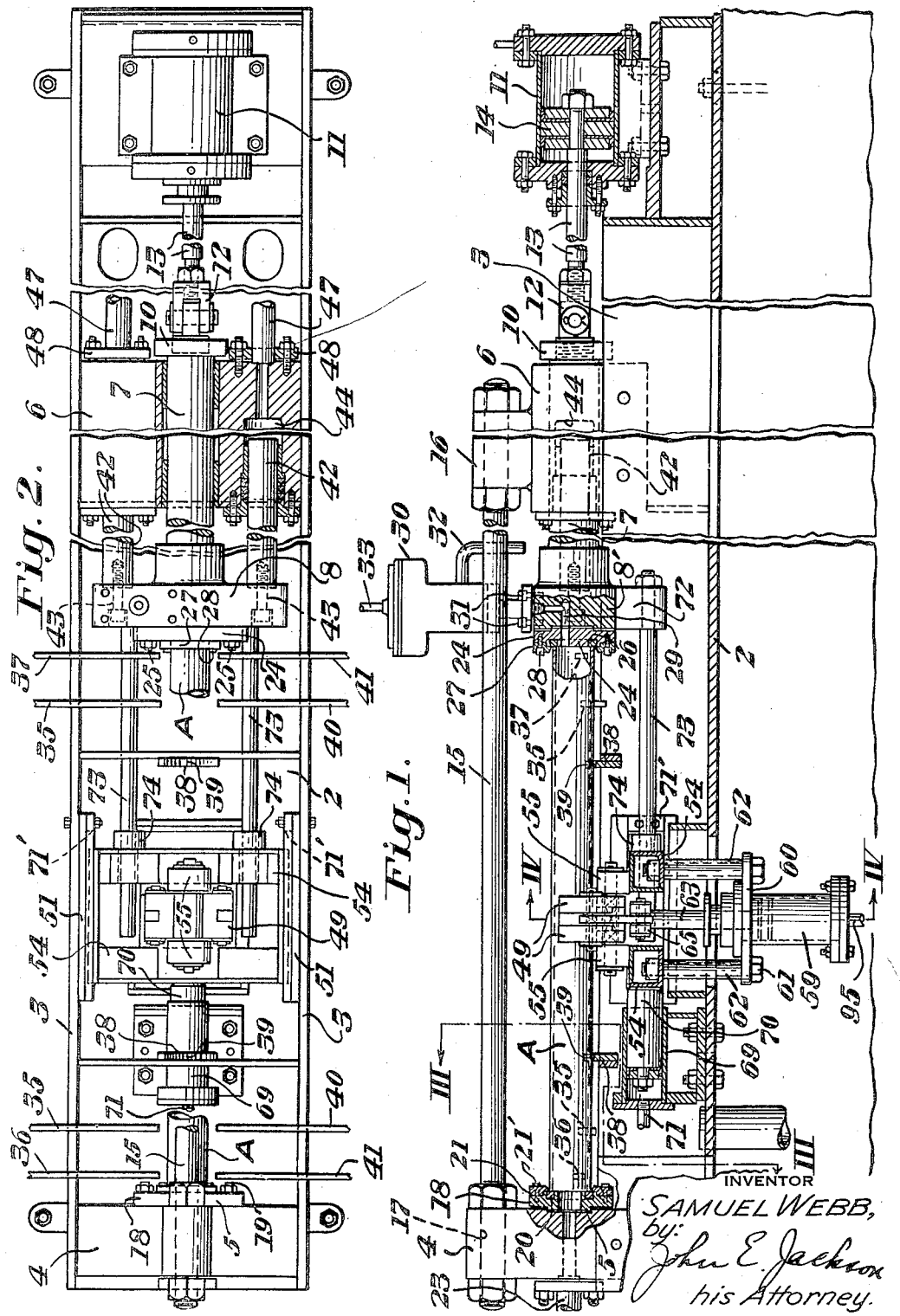

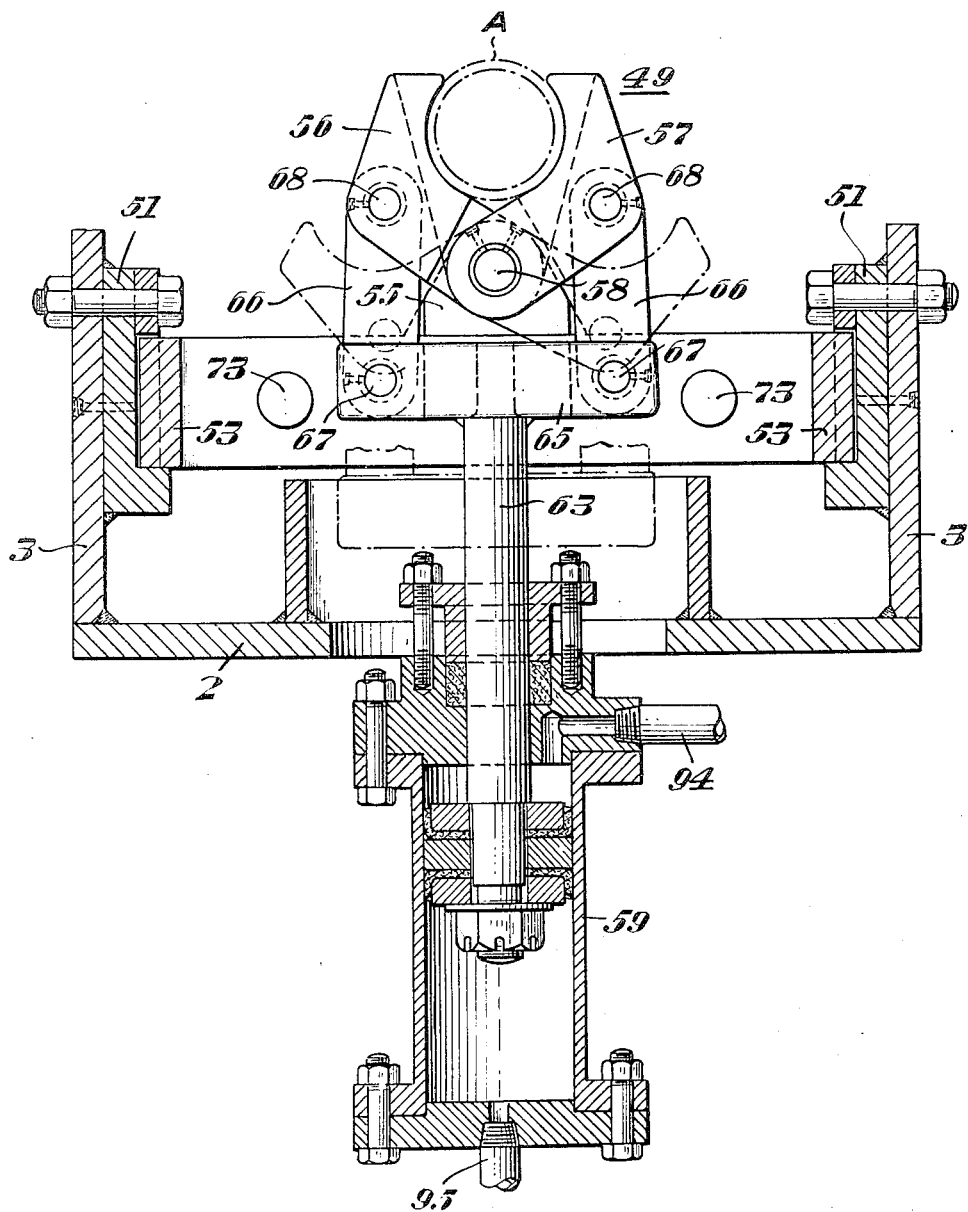

UNITED STATES PATENT OFFICE 2,497,193

HYDRAULIC TESTING MACHINE

Samuel Webb, Pittsburgh, Pa., assignor to National Tube Company, a corporation of New Jersey Application December 4, 1944, Serial No. 566,581

11 Claims. (Cl. 73—37)

This invention relates to testing and more particularly to the hydraulic testing of hollow objects such as pipes and tubes.

One object of the invention is the provision of a hydraulic testing machine in which a number of similar pipes or tubes may be tested at a rapid rate of speed.

Another object of the invention is the provision of such machine in which the pieces tested are automatically sealed and, after completion of the test, are broken away from the sealing means at both ends, thereby insuring the maintenance of uninterrupted testing cycles and the long life of the sealing means.

These and other objects of the invention will become apparent as the description proceeds.

In the hydraulic testing of hollow objects, such as pipes and tubes, the hollow object is conventionally mounted between a headstock and a tailstock carrying means sealing the object to such headstock and tailstock upon the application of pressure to the headstock in a direction coaxial of the object to be tested. The higher the hydraulic pressure employed in the test, obviously the greater has to be the force with which the headstock is advanced against the object in order to insure a perfect seal between the object and the head and tailstock. The packing material, which is ordinarily a soft metal, such as Babbitt metal or copper, necessarily flows somewhat under the high unit pressures to which it is subjected by the ends of the object. Consequently, it frequently occurs in prior art testing machines that upon completion of the hydraulic test and retraction of the headstock, one seal between the object and the head or tailstock is broken but the object will remain fixed to the other stock. Most frequently the headstock connection is broken, whereas the object, due to its inertia, remains attached to the tailstock. It is then necessary to break the remaining connection as by hammering the object, oscillating the free end of the object, or by digging at the metal seal with a cold chisel. All these methods are obviously undesirable since they mutilate the outer surface of the object, the soft metal packing, or both. In addition they seriously slow up the testing procedure, which is usually a routine testing of a large number of finished articles.

The present invention overcomes the above outlined difficulties in breaking the seal between the hollow object tested and the headstock and tailstock of prior art testing devices, by providing means which insures the breaking of both connections. The device further provides an improved means of presenting the hollow object to the testing machine and for effecting such sealing, so that the device is suitable for the rapid production testing of a large number of similar articles. It is to be understood, however, that whereas the device shown and described is particularly adapted for the production testing of a large number of relatively short articles of the same dimensions, the invention has utility in the testing of articles such as pipes of commercial lengths and of various different diameters.

The invention will be more readily understood by reference to the accompanying drawings, in which:

Figure 1 is a side elevation of the device with certain parts being shown in vertical cross section;

Figure 2 is a plan view of the testing device of the present invention with portions shown in horizontal section and with certain portions omitted for the sake of clarity;

Figure 4 is an enlarged view in section taken along the line IV—IV of Figure 1;

Figure 5:
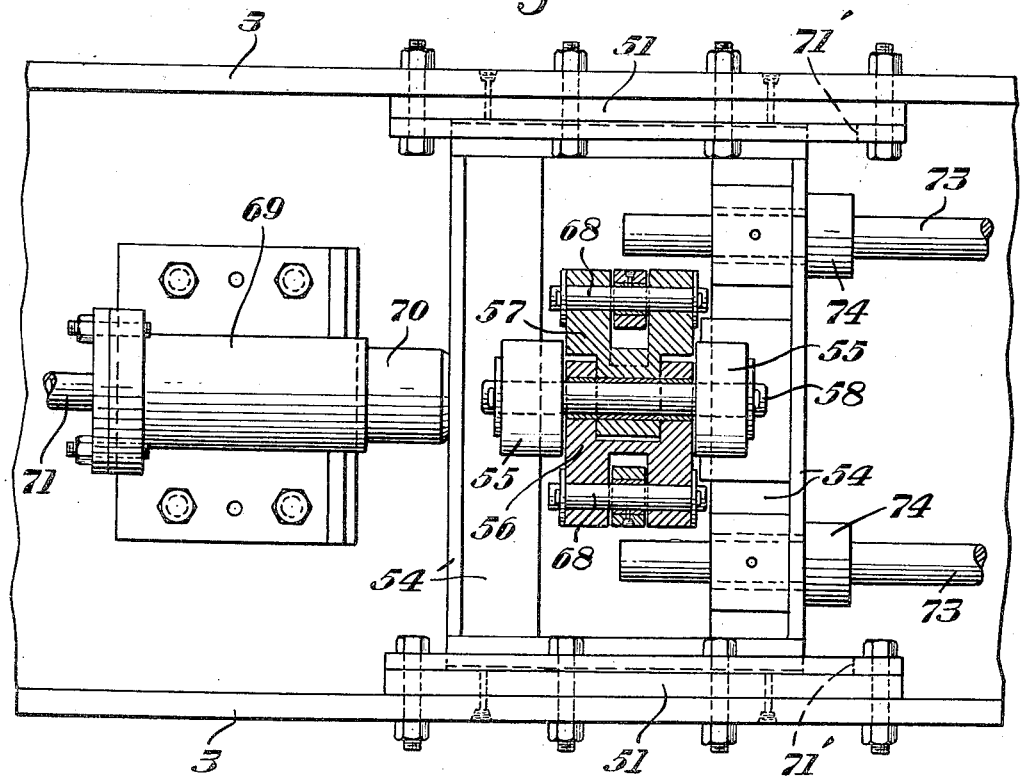
Figure 5 is a plan view of a portion of a device at the gripper for the object being tested, with certain parts of the gripper shown in cross section.

The testing device which is shown in Figures 1 and 2 is provided with a substantial foundation to which the base plate 2 for the main frame of the device is bolted. Such main frame, which, in the embodiment shown, is formed by the welding together of plates, angle irons, etc., is provided with longitudinal upstanding side plates 3. The supports for the various parts of the machine, such as the headstock operating cylinder, the tailstock, the supporting mechanism for the gripper means, and the constant pressure cylinder acting upon said gripper means, presently to be described, are bolted or welded to the base plate 2 and the side plates 3 of the device, as shown.

The device is provided, at the left hand end of Figures 1 and 2, with a massive tailstock support 4 to which is attached tailstock 5. The device is also provided with a headstock support 6 through the central bore in which plunger 7 is guided for axial movement. On the forward or left hand end of plunger 7 is affixed a crosshead 8 which carries the headstock on its outer face.

The rearward end of plunger 7 is provided with an adjustable stop collar 10, which allows adjustment of the extent of travel of the headstock in a forward direction. Plunger 7 and the headstock carried thereby are reciprocated by double acting fluid motor 11, which, in the device described, is operated by compressed air. Motor 11 is provided with a piston 14 and a piston rod 13, the latter of which is connected to plunger 7 by means of the link and clevis joint 12. In order further to brace the headstock and tailstock supports against the very large pressures which tend to separate them when a hollow object, such as a pipe, is being tested under high pressure, the tops of such supports are connected together by means of tie rod 15 which extends through the boss 16 on support 6 and through a hole 17 in the top of the tailstock support 4.

The hollow object to be tested, which in this instance is a tube designated A, is clamped between the tailstock and the headstock in such manner that it makes a water tight joint with both. Tailstock 5 consists of an annular member 18 secured to tailstock support 4 by means of bolts 19, shown in Figure 2. Ring 18 thus may be readily changed for a ring of larger or smaller diameter, depending upon the diameter of the pipe tested. Ring 18 is provided with a packing 20 of soft metal located in a groove coaxial of the ring and of the tube being tested. A guide plate 21 having a conical inner face, as shown, surrounds the packing and performs the function of guiding the end of the pipe accurately against the packing metal. Guide plate 21 is secured to ring 18 by means of cap screws 21'. The tailstock support 4 is provided with a bore therethrough and with a pipe 23, which may be selectively connected to a source of high or low pressure water as desired, thereby subjecting the interior of pipe A to hydraulic test pressure of the desired magnitude.

The headstock 23', which is similar to the tailstock 5, consists of a ring 24 secured to crosshead 8 by bolts 25. Ring 24 is provided with an annular packing 26 of soft metal for engagement with the end of the tube A and has a guide plate 27 with an inner conical face to guide the end of the tube to a position coaxial of the headstock. Guide plate 27 is attached to ring 24 by cap screws 28. Ring 24 and headstock crosshead 8 are provided with a right angled bore 29 communicating, as shown in Figure 1, with an air relief valve 30 attached to the top of crosshead 8 by bolts 31. Valve 30, which is of conventional design, allows the discharge of air from the system and from the test article through discharge pipe 32. Such discharge may be stopped, when all air has been exhausted, by the admission of compressed air through pipe 33 at the top of the valve, such air acting upon a diaphragm within the valve and causing the seating of the relatively small diameter valve plunger with sufficient force to prevent the escape of the test water at the maximum test pressures employed.

A plurality of similar tubes to be tested may be fed to the testing device by means of a conveyor comprising members 35, upon which the tubes rest, and side guides 36 and 37. Guide 36 functions as a gauge, that is, it is so placed relative to the tailstock that when tubes entering the machine are placed with their rear ends in contact with member 36, such tubes enter the testing device in the correct position longitudinally thereof to be gripped at their longitudinal center by the gripping means and to allow the head and tailstocks to effect a seal with the ends thereof without necessitating any sliding of the tube relative to the gripper. The operation and function of the gripper will be subsequently described. Guide 37 is spaced from guide or gauge 36 a distance slightly in excess of the length of the tubes to allow the tubes to be pushed against the gauge 36, but yet to prevent the possibility of their falling off the conveyor.

Figure 3:
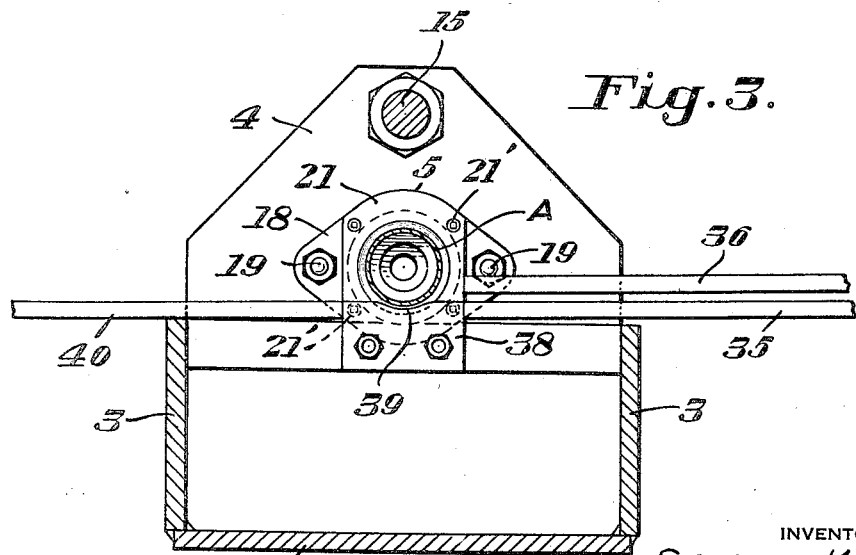
Figure 3 is a view in cross section taken on the line III—III of Figure 1.

Conveyor members 35, 36, and 37, of which members 35 and 36 are shown in Figure 3, are inclined slightly to the horizontal so that the tubes will present themselves to the device successively by means of their own weight. Stop members, not shown, may be interposed in the path of such tubes to prevent interference with the tube being tested by the tube next in line. Tubes may be fed singly in succession to the device, if desired, by means of a well-known system of alternately operative, vertically retractable, stops acting as an escapement mechanism.

The device shown is provided with two tube rests 38 located on the center line of the machine and provided on their top surface with relatively shallow centrally located depressions 39, so that the pipe is stably supported by them in a position coaxial of the tail and headstocks. The machine is further provided with an exit conveyor located on the opposite side of the machine from the entrance conveyor, such exit conveyor comprising bottom tube carrying members 40 and side guides 41. The exit conveyor may also be disposed at an angle to the horizontal so that the tested pieces when placed upon such conveyor will automatically travel to a further station.

The hydraulic testing device, here shown and described, is adapted for the testing of hollow objects under very high pressures, which may be on the order of 5,000 pounds per square inch. It is accordingly desirable to incorporate in it a sealing means between the object and the headstock and tailstock which is operated by high pressure water. Such sealing means is shown and described in the patent to Hybarger, No. 2,231,807, February 11, 1941. In the device shown, pistons 42 affixed to the rear faces of the outer portions of the headstock crosshead 8 by means of bolts 43, travel in bores 44 located in the side portions of headstock support 6. Each bore is provided with a packing gland at its forward end cooperating with piston 42, and with a smaller rearwardly directed bore with which water pipe 47 makes connection through packing means 48. Pipes 47 are connected to the same source of water as that supplying the interior of the object being tested through the tailstock. The sum of the areas of pistons 42 is made such that it equals the area of the bore of the article being tested, so that the force against the headstock crosshead 8 imposed through the headstock by the fluid within the object is balanced by the opposing force on such crosshead imposed by pistons 42.

The testing machine of the present invention incorporates therein a gripping means or gripper for the article being tested, such gripper holding the article accurately in the proper position to insure sealing of the head and tailstocks against it and to hold it from jumping out of the machine if bursting of the object under pressure should occur. Such gripper is shown generally at 49. The gripper is mounted for limited travel longitudinally of the device and of the test object on ways 51, which are supported on the vertical side frame plates 3 of the device, as shown in Figure 4. The frame of the gripper is made up of opposite side slide members 53 which travel within the ways 51, members 53 being connected, as shown in Figure 1, by hollow cross beams 54. Beams 54 are provided at their centers with bearings 55 (see Figure 5) upon which are mounted opposing arms 56 and 57 of the gripping means. Arms 56 and 57 have interfitting portions, one a fork and one a tongue, through which a hinge pin 58 extends. The pin is supported in bearings 55.

The gripper arms are caused to travel toward and away from each other by means of fluid motor 59, in this instance compressed air operated, mounted upon supporting plate 60 which is attached to the frame of the gripping means by means of bolts 61 and spacer sleeves 62. As shown in Figure 4, gripper arms 56 and 57 clear the bottom of tube A, when in retracted position, to allow the tube to be delivered to the test position by rolling down conveyor members 35. Piston rod 63 of fluid motor 59 has crosshead 65 attached to the upper end thereof. Gripper arm operating links 66 are attached on the outer ends of crosshead 65 by means of pins 67, the upper ends of said links being pivoted to an intermediate point of each of the gripper arms by means of pins 68. The inner confronting faces of gripper arms 56 and 57 are made of such shape as to conform to the outer surface of the object being tested. In the machine shown, since such object is a tube, arms 56 and 57 have inner faces which are portions of a cylinder of the same diameter as the tube. Such gripping means grasps the object with a very considerable pressure, thus preventing its release until piston rod 63 is retracted toward its downward position.

Gripper 49 is constantly subjected to a push toward the right (Figure 1) by a constantly operating fluid cylinder 69 having pistons 70, the outer end of which contacts the left hand cross member of the gripper frame. Cylinder 69 is supplied from a constant source of air pressure through supply pipe 71. Travel of the gripper to the right under the influence of cylinder 69 is limited by stops 71', located in line with ways 51, as shown in Figures 1 and 2, against which the right hand ends of slide members 53 abut when the gripper is fully retracted from the tailstock. It is at such retracted position that the gripper engages a tube when the latter is initially fed into the machine, and it is at such position that the gripper disengages a tested tube to allow its discharge from the machine.

The advance of the gripper toward the tailstock after a tube is engaged by the former is accomplished by thruster means in the form of rods 73 rigidly bolted to depending parts 72 of headstock crosshead 8, the forward ends of such rods sliding through appropriately located holes in the right hand cross member 54 of the gripper frame. Rods 73 are provided with collars 74 thereon, the left hand ends of such collars (Figure 1) being so spaced from the headstock that, when traveling to the left, the headstock contacts the right hand end of the tube being tested in such manner as to effect a seal therewith, and collar 74 then contacts the gripper frame, carrying the gripper and the tube held thereby to the left so that the left hand end of the tube enters and makes a seal with the tailstock. Rods 73 or the collars thereon may be made longitudinally adjustable to attain the proper spacing of the left face of the collars as to bring about such sequential sealing.

After the tube has been tested, that is, subjected to high pressure water for a given length of time, the pressure is released and the headstock retracted by means of motor 11. The headstock thus travels to the right carrying rods 73 and collars 74 with it, and thus allowing constant pressure air motor 69 to push the gripper means and the tube A to the right. Such travel effects a breaking of the seal at the tailstock. After the headstock has traveled a distance which may be approximately one-half its full stroke, gripper side slides 53 engage stops 71', the travel of the gripper 49 and tube A is stopped, and, since the headstock continues to move to the right, the seal between the tube A and the headstock is then broken. Upon completion of the travel of the headstock to retracted position, the gripper is opened and the tested tube removed, after which a new tube is inserted in the device and the testing cycle repeated.

Figure 6:
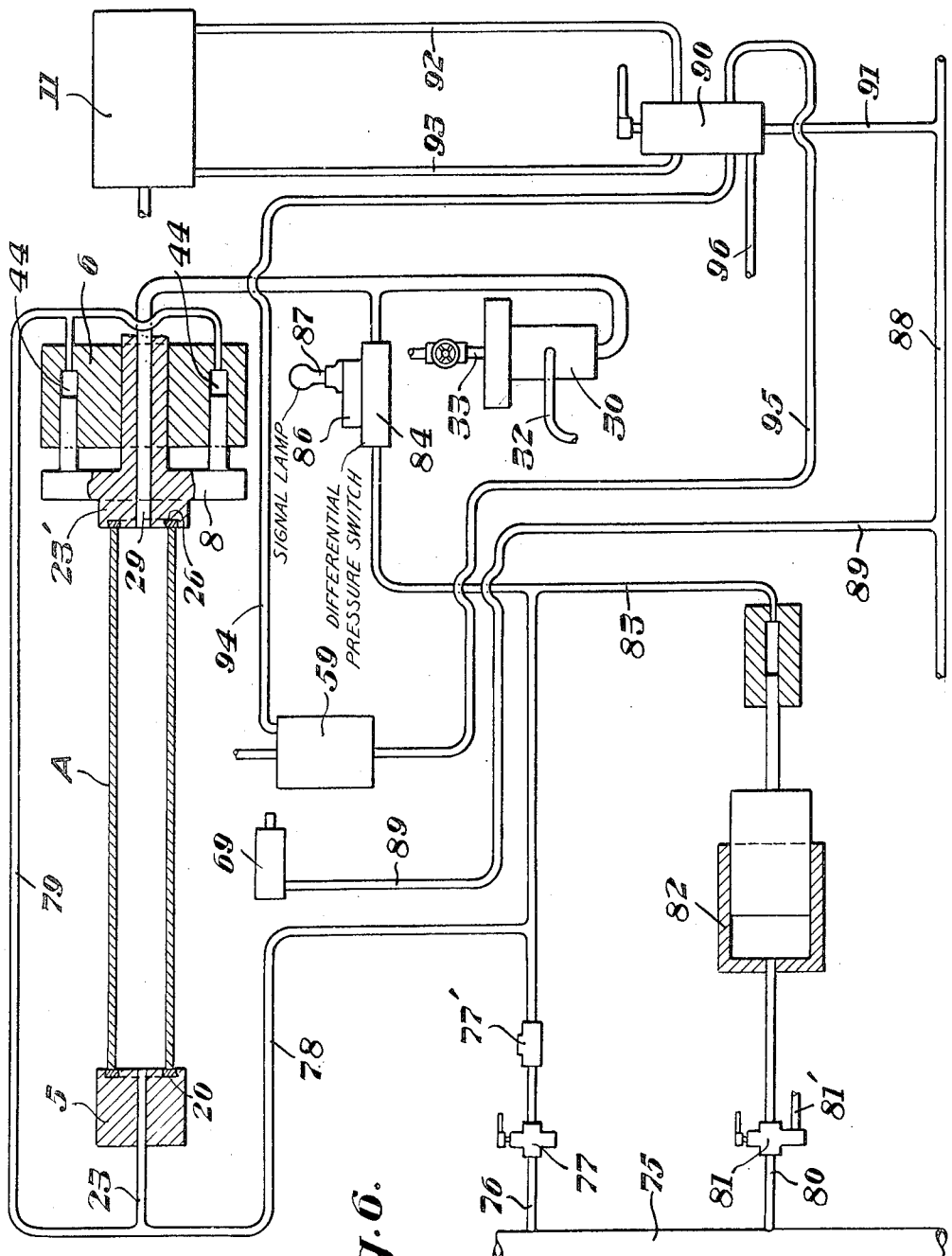
Figure 6 is a schematic view showing the hydraulic and air systems and the controls therefor which are employed in the operation of the device.

The cycle of operations employed in a typical test and the manner in which the machine is controlled will be made clear by a consideration of the layout shown in Figure 6.

Compressed air for the operation of headstock operating motor 11, gripper operating motor 59, and constant pressure air motor 69 is supplied by main 88. The constant pressure air motor 69 is connected directly to such main as shown. Headstock operating motor 11 and gripper operating motor 59, however, are connected to main 88 through line 91 through manually operated valve 90 which controls the sequential operation of such two motors. Valve 90 is so constructed that the gripper operating motor 59 may be first actuated by allowing air to flow into line 95 following the movement of the valve operating handle to a first operating position. Air is allowed to flow through line 92 to the right hand end of headstock operating motor 11, only by turning the handle of valve 90 to a further position, thus insuring the desired sequential operation of the two motors in the mounting of an article preparatory to testing it. Valve 90 is also constructed so that in a third operating position of the handle, the headstock is retracted by directing air into the left hand end of the headstock operating motor 11 through pipe 93, and that only upon further movement of the operating handle to a fourth operating position will pipe 94 leading to the top of the gripper actuating motor receive air under pressure, thus insuring the desired sequence of operations. Valve 90 is so constructed as to connect the opposite ends of the motors from those receiving air under pressure to exhaust pipe 96 at all times.

The water for the test is supplied from main 75 under a relatively low pressure, say 100 pounds per square inch. Water at such pressure is led through line 76, manually operated valve 77, and check valve 77' into line 78 which leads to the tailstock, and which is connected through branch line 79 to the sealing cylinders 44, previously described. A further line 80 leads off main 75 through manually operated valve 81 into the large cylinder of intensifier 82. Valve 81 is provided with an exhaust line 81' which allows release of the pressure in the large cylinder of the intensifier when valve 81 is closed. High pressure line 83 leads from the high pressure side of the intensifier and connects with lines 78 and 79 and also to one end of a differential-pressure actuator 84, the other end of such actuator being connected to a line from the headstock. The actuator is one of the well-known type in which two cylinders having slightly different effective areas oppose each other. In this instance, the cylinder connected to the headstock is slightly larger than that connected to the intensifier. Thus, when the pressure at the headstock substantially equals the pressure at the intensifier the pressure actuator will operate switch 86 and thus light signal light 87, which informs the operator when the article has been subjected to the full test pressure.

A typical test cycle for the testing of a tube is carried out by the device shown and described, as follows:

A tube A is presented to the machine by having rolled down conveyor 35 with its left hand end in contact with gauge 36. The tube thus lies on rests 38 with its ends, in the machine shown, approximately equidistant from the tailstock and the fully retracted headstock. Valve 90, which was initially in such position as to deliver air to the left hand end of motor 11 and the upper end of motor 59, is now moved to deliver air to the lower end of motor 59 and exhaust it from the upper end. The gripper 49 thus grasps the tube. Valve 90 is then further actuated to deliver air to the right hand end of motor 11 and to exhaust air from the left hand end of such motor. Headstock 23' thus travels to the left toward its operative position. Approximately half-way of its travel the headstock contacts the right hand end of tube A, which is held in place by the gripper which is held in its right hand limit of travel by constant pressure motor 69. The headstock thus makes a seal with the end of the tube, and after it has done so, collars 74 contact the gripper frame and force it to the left, due to the overpowering of motor 69 by motor 11. The tube is thus carried to the left where, at the end of its travel, it makes a seal with the tailstock 5.

The tube is now ready to be subjected to hydraulic pressure. It is first filled with low pressure water by the actuation of valve 77 and the opening of valve 30 to allow the escape of air. Valve 30 is then closed.

The tube is now subjected to high pressure water by opening valve 81 to actuate the intensifier 82. After the light 87 signals that the pressure at the headstock equals that at the intensifier, valve 81 is closed, thus connecting the large cylinder of the intensifier to exhaust 81' and releasing the high pressure on the tube. Valve 77 is also closed. The tube is now ready to be removed from the testing machine.

The valve 90 is then operated to direct pressure to the left hand end of motor 11. The headstock, gripper, and tube A are thus moved away from the tailstock, the gripper contacts stops 71', and the headstock continues to move until it reaches full retracted position, thereby effecting the positive breaking of the seals at the tailstock and headstock. Valve 90 is then turned to deliver air to the upper end of gripper motor 59 and to exhaust it from the lower end of said motor. The gripper thus releases the tube, which can then be rolled out of the depressions on the rests 38 onto exit conveyor 40. The machine, with the opening of relief valve 30, is then ready for the testing of another tube in the same manner.

While I have shown and described one specific embodiment of my invention, it will be understood that I do not wish to be limited exactly thereto since various modifications may be made within the scope of my invention. Having thus fully disclosed a preferred embodiment of the hydraulic testing machine of the present invention and the manner in which it operates, I desire to claim as new the following:

1. A testing machine for subjecting the interior of a hollow article to fluid pressure which comprises in combination a tailstock, a headstock, means for moving the headstock toward and away from the tailstock for holding a hollow article between the tailstock and headstock and for releasing it, respectively, means on the tailstock and headstock for forming a seal between the article and the tailstock and headstock when the latter is advanced toward the tailstock, means for gripping the article at a point intermediate its ends, means supporting the gripping means for travel in a direction toward and away from the tailstock, stop means for limiting the extent of travel of the gripping means away from the tailstock, means operated by the headstock moving means after the headstock has advanced at least substantially into contact with one end of the article to thrust the gripping means and the article held thereby toward the tailstock, and means constantly exerting a force upon the gripping means in a direction away from the tailstock, whereby the gripping means and the article held thereby are positively moved away from the tailstock when the headstock is retracted from the tailstock.

2. A testing machine for subjecting the interior of a hollow article to fluid pressure which comprises in combination a tailstock, a headstock, means for moving the headstock toward and away from the tailstock for holding a hollow article therebetween and for releasing it, respectively, means on the tailstock and headstock for forming a seal between the article and the tailstock and headstock when the latter is advanced toward the tailstock, means for gripping the article tested at a point intermediate its ends, means for supporting the gripping means for travel in a direction toward and away from the tailstock, means to thrust the gripping means and the article held thereby toward the tailstock when the headstock is advanced toward the tailstock, said last named means comprising a lost motion connection in the form of at least one thrust rod between the two members consisting of the headstock moving means and the gripping means, said rod being positively connected to one of said two members and having a thrust collar thereon to engage the other of said two members, and means to thrust the gripping means and the article held thereby away from the tailstock when the headstock is retracted from the tailstock.

3. A testing machine for subjecting the interior of a hollow article to fluid pressure which comprises in combination a tailstock, a headstock, means for moving the headstock toward and away from the tailstock for holding a hollow article between the tailstock and headstock and for releasing it, respectively, means on the tailstock and headstock for forming a seal between the article and tailstock and headstock when the latter is advanced toward the tailstock, means for gripping the article at a point intermediate its ends, means supporting the gripping means for travel in a direction toward and away from the tailstock, stop means for limiting the extent of travel of the gripping means away from the tailstock, means operated by the headstock moving means after the headstock has advanced at least substantially into contact with one end of the article to thrust the gripping means and the article held thereby toward the tailstock, and means exerting a force upon the gripping means in a direction away from the tailstock when the headstock is moved away from the tailstock, whereby the gripping means and the article held thereby are positively moved away from the tailstock when the headstock is retracted from the tailstock.

4. A testing machine for subjecting the interior of a tube to fluid pressure which comprises in combination a support, a tailstock fixed relative to the support, a headstock reciprocably mounted on the support, means for moving the headstock toward and away from the tailstock for holding the tube between the tailstock and headstock and for releasing it, respectively, means on the tailstock and headstock for forming a seal between the tube and the tailstock and headstock when the latter is advanced toward the tailstock, means for gripping the tube at a point substantially at its longitudinal center, means for operating the gripping means to effect gripping and releasing of the tube, means supporting the gripping means for travel in a direction toward and away from the tailstock upon travel of the headstock toward and away from the tailstock respectively, stop means for limiting the extent of travel of the gripping means toward and away from the tailstock, and means exerting a force upon the gripping means in a direction away from the tailstock when the headstock is moved away from the tailstock whereby the gripping means and the article held thereby are positively moved away from the tailstock when the headstock is retracted from the tailstock.

5. A testing machine for subjecting the interior of a hollow article to fluid pressure which comprises in combination a support, a tailstock fixed relative to the support, a headstock reciprocably mounted on the support, means for moving the headstock toward and away from the tailstock, for holding a hollow article between the tailstock and headstock and for releasing it, respectively, means on the tailstock and headstock for forming a seal between the article and tailstock and headstock when the latter is advanced toward the tailstock, means for gripping the article tested at a point intermediate its ends, means supporting the gripping means and for causing it to travel in a direction toward and away from the tailstock upon travel of the headstock toward and away from the tailstock respectively, stop means for limiting the extent of travel of the gripping means away from the tailstock, means for conveying a number of similar articles to be tested to the device, means for positioning the ends of the article introduced into the machine relative to the gripper at its retracted position furthest from the tailstock, the tailstock, and the headstock at its retracted position, so that upon actuation of the gripping means to grip the hollow articles so introduced and subsequent advance of the headstock a seal is effected between the hollow article and the tailstock and headstock without longitudinal movement of the hollow article relative to the gripping means.

6. A testing machine for subjecting the interior of a hollow article to fluid pressure which comprises in combination a support, a tailstock fixed relative to the support, a headstock reciprocably mounted on the support, means for moving the headstock toward and away from the tailstock, for holding a hollow article between the tailstock and headstock and for releasing it, respectively, means on the tailstock and headstock for forming a seal between the article and tailstock and headstock when the latter is advanced toward the tailstock, means for gripping the article tested at a point intermediate its ends, means supporting the gripping means and for causing it to travel in a direction toward and away from the tailstock upon travel of the headstock toward and away from the tailstock respectively, stop means for limiting the extent of travel of the gripping means toward and away from the tailstock, means for conveying a number of similar articles to be tested to the device in positions parallel to the position they will occupy in the device, and means on the conveying means for positioning the ends of the article introduced into the machine relative to the gripper at its retracted position furthest from the tailstock, the tailstock, and the headstock at its retraced position so that upon actuation of the gripping means to grip the hollow articles so introduced and subsequent advance of the headstock a seal is effected between the hollow article and the tailstock and headstock without longitudinal movement of the hollow article relative to the gripping means.

7. A testing machine for subjecting the interior of a hollow article to fluid pressure which comprises in combination a support, a tailstock fixed relative to the support, a headstock reciprocably mounted on the support, means for moving the headstock toward and away from the tailstock for holding a hollow article between the tailstock and headstock and for releasing it, respectively, means on the tailstock and headstock for forming a seal between the article and tailstock and headstock when the latter is advanced toward the tailstock, means for gripping an article at a point intermediate its ends, means supporting the gripping means for travel in a direction toward and away from the tailstock upon travel of the headstock toward and away from the tailstock respectively, stop means for limiting the extent of travel of the gripping means away from the headstock, means exerting a force upon the gripping means in a direction away from the tailstock, means for conveying a number of similar articles to be tested to the device, means for positioning the ends of the article introduced into the machine relative to the gripper at its retracted position furthest from the tailstock, the tailstock, and the headstock in its retracted position so that upon actuation of the gripping means to grip the hollow article and subsequent advance of the headstock, a seal is effected between the hollow article and tailstock and headstock without longitudinal movement of the hollow article relative to the gripping means.

8. A testing machine for subjecting the interior of a tube to fluid pressure which comprises in combination a support, a tailstock fixed relative to the support, a headstock reciprocably mounted on the support, means for moving the headstock toward and away from the tailstock for holding the tube between the tailstock and headstock and for releasing it, respectively, means on the tailstock and headstock for forming a seal between the tube and the tailstock and headstock when the latter is advanced toward the tailstock, means for gripping the tube at a point substantially at its longitudinal center, means for operating the gripping means to effect gripping and releasing of the tube, means mounting said gripping means for movement out of the lateral travel of the tube into and out of the device, means supporting the gripping means for travel in a direction toward and away from the tailstock upon travel of the headstock toward and away from the tailstock respectively, stop means for limiting the extent of travel of the gripping means away from the tailstock, means constantly exerting a force upon the gripping means in a direction away from the tailstock, means for laterally conveying a number of similar hollow articles to be tested to the device in positions parallel to the position they will occupy in the device, means for positioning the ends of the article introduced into the machine relative to the gripper at its retracted position furthest from the tailstock, the tailstock, and the headstock in its retracted position so that upon actuation of the gripping means to grip the hollow article and subsequent advance of the headstock a seal is effected between the hollow article and the tailstock and headstock without longitudinal movement of the hollow article relative to the gripping means.

9. A pipe-testing machine comprising a fixed tailstock, a headstock movable toward and from the tailstock, an actuating motor connected to the headstock, a gripper intermediate the headstock and tailstock adapted to engage a pipe length to be clamped between the headstock and tailstock, means mounting the gripper for movement toward and from the tailstock, and thruster means actuated by the headstock and cooperating with the gripper after initial movement of the headstock toward the tailstock to cause the gripper thereafter to move with the headstock on continued movement of the latter toward the tailstock.

10. The apparatus defined by claim 9 characterized by yielding means constantly urging the gripper to move away from the tailstock and a stop limiting movement of the gripper under the force of said yielding means.

11. The apparatus defined by claim 9 characterized by said thruster means being a push rod extending from one of said gripper and headstock toward the other.

SAMUEL WEBB.

REFERENCES CITED

The following references are of record in the file of this patent:

UNITED STATES PATENTS

| Number | Name | Date |
|---|---|---|
| 1,972,630 | Neale | Sept. 4, 1934 |
| 1,973,674 | Rosenkronz | Sept. 11, 1934 |
| 2,183,974 | Richardson | Dec. 19, 1939 |
| 2,231,807 | Hybarger | Feb. 11, 1941 |
| 2,242,658 | Protin | May 20, 1941 |
| 2,336,524 | Bannister | Dec. 14, 1943 |